US005597197A

United States Patent [19]
Mowar et al.

[11] Patent Number: 5,597,197
[45] Date of Patent: Jan. 28, 1997

[54] AUTOMOBILE COVER

[76] Inventors: Zeev Mowar; Amnon Kariv, both of 17 Ben-Gurion St., Raanana, Israel

[21] Appl. No.: 297,133

[22] Filed: Aug. 29, 1994

[30] Foreign Application Priority Data

Aug. 29, 1993 [IL] Israel ........................ 106828

[51] Int. Cl.$^6$ ........................................ B60J 11/00
[52] U.S. Cl. ........................... 296/136; 150/166
[58] Field of Search ................... 296/136, 95.1; 150/166, 168; 160/370.21, 370.22, 370.23

[56] References Cited

U.S. PATENT DOCUMENTS

| | | | |
|---|---|---|---|
| 4,842,324 | 6/1989 | Carden | 296/136 |
| 4,948,191 | 8/1990 | Cao | 296/136 X |
| 4,958,881 | 9/1990 | Piros | 296/136 X |
| 4,973,100 | 11/1990 | Yang | 296/136 |
| 5,029,933 | 7/1991 | Gillem | 296/136 |
| 5,188,417 | 2/1993 | Curchod | 296/136 |
| 5,244,245 | 9/1993 | Kashino | 296/136 |
| 5,364,155 | 11/1994 | Kuwahara et al. | 296/136 |
| 5,456,515 | 10/1995 | Dang | 296/95.1 |

Primary Examiner—Andrew C. Pike
Attorney, Agent, or Firm—Edward Langer

[57] ABSTRACT

An automobile sunshade cover shades a passenger compartment of an automobile. The sunshade is attached at one end to a pouch for storing the cover, and is arranged so that the pouch is freely suspended by laces from suitable fittings of the automobile, such as the hinges attaching the lid of the trunk to the automobile body. The pouch serves to anchor the sunshade when deployed. The sunshade has a crossbar attached to its front edge which provides a convenient grip for the user during the deployment and folding back of the cover, while acting as a second anchor of the cover when placed under the windshield wipers. In its operative position, the sunshade covers all the automobile's windows providing protection against the sun regardless of the time of day that the sunshade is deployed or the orientation of the parked vehicle. The sunshade does not cover the automobile's registration plates or rear reflectors. It is conveniently and unobtrusively stored away in the trunk when not in use to overcome the disadvantages of regular sunblinds, which typically obstruct a driver's field of view or clutter up an automobile's interior.

12 Claims, 3 Drawing Sheets

AUTOMOBILE COVER

FIELD OF THE INVENTION

The present invention relates to automobile accessories in general, and to devices for providing protection against the sun's blaze in particular.

BACKGROUND OF THE INVENTION

Known devices for providing protection against damages to an automobile's interior and heat build-up caused by the sun's blaze generally fall into two categories: covers tailored to fully envelop the automobile's body and sunblinds adapted to be extendable across a window thereof.

Automobile covers have been available for a long time; however, they remain unpopular for several reasons. First, their deployment and re-folding are both cumbersome and time-consuming. Second, their considerable bulk causes a significant loss of a trunk's storage capacity. Third, their covering up of the automobile's registration plate and rear reflector panels obligates the vehicle owner to have the registration number of the vehicle stamped on the cover and to affix additional reflectors thereto.

Examples of automobile covers are provided in the disclosures of U.S. Pat. Nos. 5,188,417 to Curchod, 4,973,100 to Yang, and 4,596,418 to Koh. The Curchod patent discloses a storable cover for covering the cabin portion of a vehicle, and the cover is stored in a compartment disposed on the underside of trunk lid of the vehicle. The cover is deployed by being taken out of the storage compartment in the trunk, such that its trailing edge remains attached thereto, and after it is unfurled, it is fed through the opening created between the raised trunk lid and the rear windshield, after which the trunk lid is closed.

The Yang patent discloses a full size car cover storable in a bag suspended in the trunk, with a water collection container for pouring away water drained from the stored cover while suspended in the trunk of the automobile. The Koh patent discloses a full size vehicle cover stored in a pocket mounted on the underside of the trunk lid, with the cover remaining attached to the pocket when the trunk lid is closed.

The sunblinds adapted to be extendable across a window also generally fall into two categories. The first type of sunblind which includes, for example, Venetian blinds is exemplified by being permanently affixed to a window. The sunblinds are typically convenient to deploy; however, their constant presence, particularly when mounted on the windscreen, obstruct a driver's field of vision. In addition, they are impractical for affixing to side windows and therefore do not effectively block out all of the sun's blaze.

The second type of sunblind which includes, for example, the "Carcool" available from Jasmin Marketing Ltd., Tel Aviv, Israel and described in Israel Patent No. 42796, is exemplified by being a self-contained unit stored in a collapsed state when not in use and held in a stretched state juxtaposed against a window when required by a fitting in the automobile. The sunblinds suffer from the disadvantages of cluttering up an automobile's interior and only being effectively deployable against the windscreen by virtue of the automobile's sun-visors.

Other disadvantages of sunblinds are that their protection is limited to only a few hours of the day and is dependent on the orientation of the parked vehicle. It is often the case that a sunblind deployed in the morning is ineffective in the afternoon.

Therefore, it would be desirable to provide an automobile sunshade that overcomes the deficiencies of existing devices for providing protection against the sun's blaze.

SUMMARY OF THE INVENTION

Accordingly, it is a principal object of the present invention to provide an automobile sunshade that can be easily deployed into its operative position for blocking out the sun's blaze and compactly stored away in the trunk of an automobile when not in use.

In accordance with a preferred embodiment of the present invention, there is a provided an automobile sunshade comprising:

a cover for covering at least the passenger compartment of an automobile;

storage means for storing said cover wherein one end of said cover is attached to said storage means; and means for attaching said storage means in a suspended fashion from a fitting of the automobile.

In a preferred embodiment, the automobile sunshade comprises a cover providing shade for a passenger compartment of an automobile. The sunshade further comprises a pouch for storing the cover, and is arranged so that the pouch is freely suspended by laces from suitable fittings of the automobile, such as the hinges attaching the lid of the trunk to the automobile body. The pouch serves to anchor the sunshade when deployed.

The sunshade also comprises a crossbar attached to its front edge which provides a convenient grip for the user during the deployment and folding back of the cover, while acting as a second anchor of the cover when placed under the windshield wipers.

In its operative position, the sunshade covers all the automobile's windows providing all the day round protection regardless of the time of day that the sunshade is deployed or the orientation of the parked vehicle. The sunshade does not cover the automobile's registration plates or rear reflectors.

The sunshade is conveniently and unobtrusively stored away in the trunk when not in use to overcome the disadvantages of regular sunblinds of either obstructing a driver's field of view or cluttering up an automobile's interior.

Other features and advantages of the invention will become apparent from the following drawings and description.

BRIEF DESCRIPTION OF THE DRAWINGS

For a better understanding of the present invention with regard to the preferred embodiment thereof, reference is made to the accompanying drawings in which like numerals designate corresponding elements throughout and in which.

DETAILED DESCRIPTION OF A PREFERRED EMBODIMENT

Figure 1:
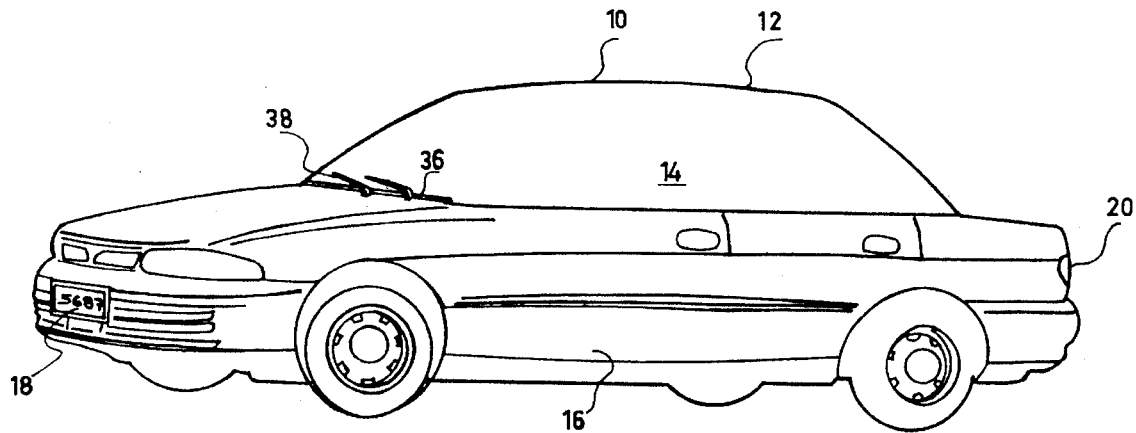
FIG. 1 is an overall view of an automobile covered by a sunshade according to the present invention.

Referring now to FIG. 1, there is shown an automobile sunshade 10, constructed and operative in accordance with the principles of the present invention, in its deployed state comprising a cover 12 providing shade for passenger compartment 14 of automobile 16.

Cover 12 provides protection all day long against the sun's blaze by covering all the windows of passenger compartment 14 regardless of the time of day that sunshade 10 is deployed or orientation of the parked vehicle. It is a further feature that cover 12 does not conceal registration plates 18 or rear reflectors 20 of automobile 16.

Figure 2:
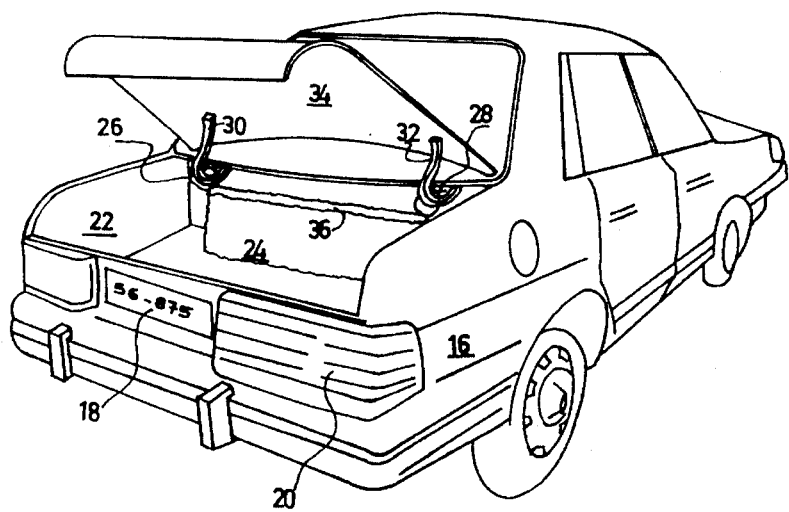
FIG. 2 shows the sunshade stored away in the trunk of the automobile of FIG. 1.
Figure 3:
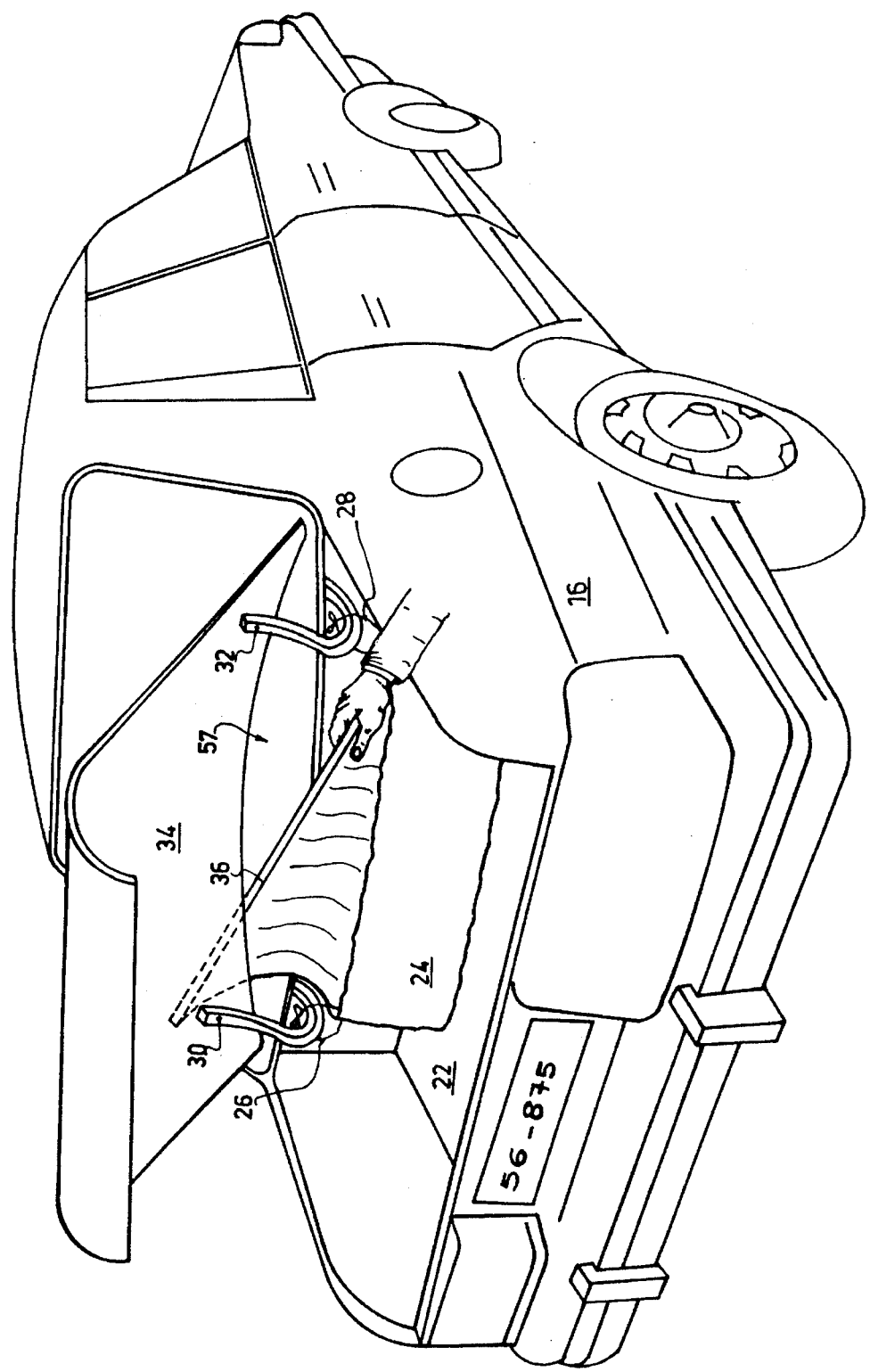
FIG. 3 shows the sunshade being reomved from storage for deployment on the automobile.

FIGS. 2 and 3 show how sunshade 10 is conveniently and unobtrusively stored away in trunk 22 when not in use to overcome the disadvantages of regular sunblinds of either obstructing a driver's field of view or cluttering up an automobile's interior.

Sunshade 10 further comprises a pouch 24 for storing cover 12. Cover 12 is attached to pouch 24 which acts as a first anchor thereof when sunshade 10 is deployed. Pouch 24 is freely suspended by two pairs of laces 26 and 28, at either end thereof, from suitable fittings of the automobile. Such fittings can typically be hinges 30 and 32 attaching lid 34 of trunk 22 to the automobile body.

Housing pouch 24 in trunk 22 ensures that sunshade 10 is stored In a space saving manner. The loss of storage capacity of trunk 22 is minimized by virtue of pouch 24 being freely suspended such that the loading of suitcases or the like into trunk 22 simply pushes pouch 24 further backwards into trunk 22.

Unlike the Curchod patent described in the background, where the storage compartment for the cover is attached to the underside of the trunk lid, decreasing the overall height of usable trunk storage space, the freely suspended pouch 24 of the inventive design is not attached to the underside of the trunk lid, and does not reduce trunk storage space. Since sunshade can be directly stuffed into pouch 24, without intermediate folding steps needed with the Curchod cover, it is easier to use.

Sunshade 10 also comprises a crossbar 36 attached to front edge of cover 12. Crossbar 36 fulfills two functions: first, it presents a convenient grip for the user during the deployment and folding back of cover 12, and second, it underlies windscreen wipers 38, acting as a second anchor of cover 12, when sunshade 10 is deployed as shown in FIG. 1.

Figure 4:
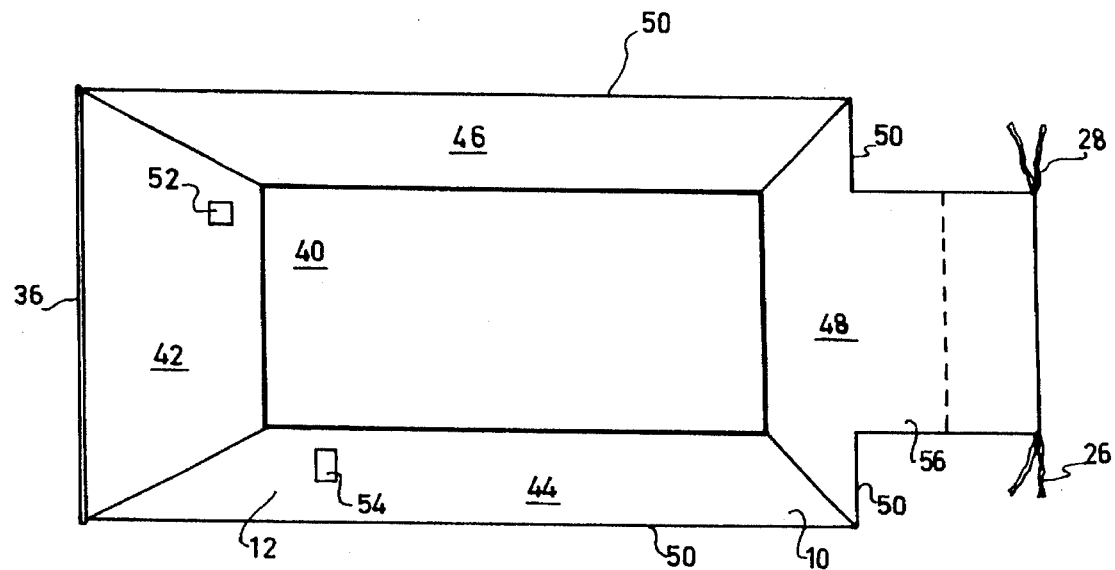
FIG. 4 shows a plane view of the sunshade before it is made up.
Figure 5:
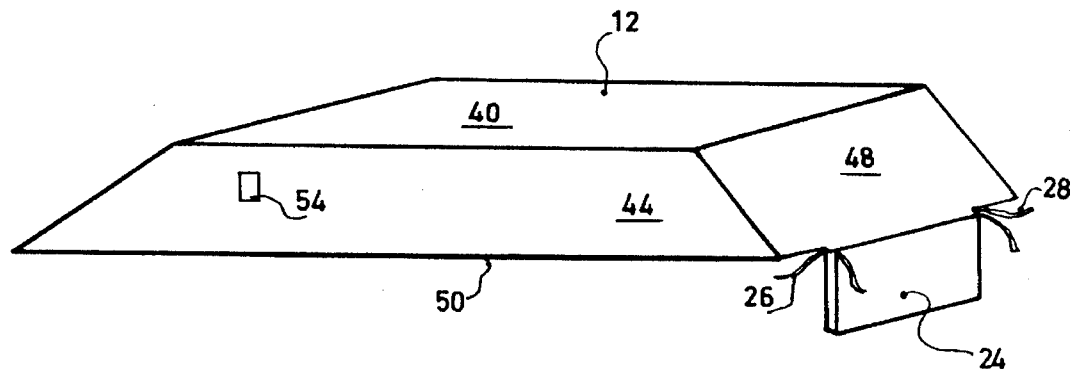
FIG. 5 shows an illustrative, three dimensional view of a made-up sunshade in a deployed state.

Turning now to FIGS. 4 and 5, further details of construction of sunshade 10 are now described. Cover 12 is preferably prepared from fine durable cloth, for example, of the type used for parachutes and Includes five panels 40, 42, 44, 46, and 48 for covering the roof, windscreen, driver and passenger sides and rear window, respectively, sewn together along their common edges as shown. Peripheral edge 50 of cover 12 is preferably finished into an elasticized hem for embracing the automobile body.

Panel 40 for covering the roof is generally rectangular. Panels 42, 44, and 46 for covering the driver and passenger side windows and windscreen, respectively, are generally trapezoid shaped. Panels 42 and 44 can be provided with windows 52 and 54, respectively, made from a transparent material, for displaying parking zone permits or the like. Panel 48 for covering rear window is dovetailed shaped so that tail portion 56 thereof can be folded back onto itself and corresponding edges thereof can be sewn together to form pouch 24. Alternatively, pouch 24 can be made from a more durable material in which case cover 12 has to be sewn or otherwise attached to pouch 24.

The use of sunshade 10 is now described. In its stored state, cover 12 is stuffed inside pouch 24 and sunshade 10 is entirely housed in trunk 22.

First, trunk lid 34 is opened and crossbar 36 passed through the gap 57 between lid 34 and passenger compartment 14. While maintaining his grip on crossbar 36, the user then walks alongside automobile 16 in the direction of the front bumper unfurling cover 12 from pouch 24. On reaching the front of passenger compartment 14, the user lifts up and lowers one of windscreen wipers 38 to trap the leading edge of cover 12 such that crossbar 36 underlies the windscreen wiper. Lid 34 is then closed so that cover 12 is tightened between its two anchors, pouch 24 and crossbar 36.

The final adjustment to be made to ensure that sunshade 10 is properly deployed is to pull down panels 44 and 46 and parts of panel 48 such that elasticized hem 50 thereof embraces the automobile body. The combined action of anchors 24 and 36 and elasticized hem 50 tensions cover 12 so that It can withstand moderate gusts of winds and still remain in its shade-providing operative state.

The folding away of sunshade 10 is largely the reverse procedure of its deployment. Hence, crossbar 36 must be first released. Then the user grips crossbar 36 and walks towards the rear bumper while holding crossbar 36 and gathering more material 12. After opening lid 34, the user passes crossbar 36 and cover 12 through the gap between lid 34 and passenger compartment before stuffing cover 12 back into pouch 24.

It will now be readily appreciated that the sunshade according to the teachings of the present invention provides a simple, low cost but highly effective solution to the problem of protecting the interior of the car against the damages caused by the sun's blaze and thereby satisfies a long felt need of automobile owners. The inventive sunshade may be modified to provide a variety of sunshades adapted to cover the different sizes and shapes of automobiles, including hatchbacks.

Having described the invention in connection with a specific embodiment thereof, it is to be understood that the description is not meant as a limitation since further modifications may suggest themselves to those ski 1 led in the art and it is intended to cover such modifications as fall within the scope of the appended claims.

We claim:

1. An automobile sunshade comprising:
   a cover for covering at least a passenger compartment of an automobile, said cover comprising a cloth having a substantially rigid crossbar attached to a free edge thereof;
   a pouch for storing said cover wherein one end of said cover is attached to said pouch; and
   at least a pair of laces, said laces being attached by tying to a respective one of a pair of hinges of a trunk lid of said automobile, to maintain said pouch in freely suspended fashion from said hinges of said automobile trunk lid,
   such that said cover can be deployed by withdrawal directly from said pouch through an opening between said trunk lid and said automobiles, and unfurled while said substantially rigid crossbar is held by a user walking alongside said automobile.

2. The sunshade of claim 1 wherein said pouch is integrally formed from an extension of said cover.

3. The sunshade of claim 1 wherein each of two pairs of said laces are attached by tying to the respective one of said pair of hinges of said automobile trunk lid.

4. The sunshade of claim 1 wherein said cover is retained in position and cannot be removed when said trunk lid is closed.

5. The sunshade of claim 1 wherein said crossbar enables said free edge to be positioned and fixed under windshield wipers.

6. The sunshade of claim 1 wherein said free edge of said cloth is finished into an elasticized hem for embracing said passenger compartment to hold said cover in its deployed state.

7. An automobile sunshade comprising:

a cover for covering at least a passenger compartment of an automobile, said cover comprising a cloth having a substantially rigid crossbar attached to a free edge thereof for maintaining said cover unfurled during rapid deployment thereof over said passenger compartment;

a pouch for storing said cover wherein said pouch is integrally formed from an extension of said cover; and means for attaching sad pouch in suspended fashion pair of hinges of a trunk lid of the automobile, wherein said attaching means comprises two pairs of laces each pair being attached to an end of said pouch, each of said pairs of laces being tied to a respective one of said pair of said trunk lid hinges, such that said pouch is freely suspended by said laces with an automobile trunk compartment, such that said cover can be deployed by withdrawal directly from said pouch through an opening between said trunk lid and said automobile, and unfurled while said rigid crossbar is held by a user walking alongside said automobile.

8. The sunshade of claim 7 wherein said substantially rigid crossbar enables said free edge to be positioned and fixed under a pair of windshield wipers of said automobile.

9. The sunshade of claim 7 wherein said free edge of said cloth is finished into an elasticized hem for embracing said passenger compartment to hold said cover in its deployed state.

10. A method of covering and uncovering a passenger compartment of an automobile, said method comprising the steps of:

opening a trunk lid of the automobile;

providing a cover for covering at least the passenger compartment of the automobile, said cover comprising a cloth having a substantially rigid crossbar attached to a free edge thereof for maintaining said cover unfurled during rapid deployment thereof over said passenger compartment;

storing said cover within a pouch wherein one end of said cover is attached to said pouch;

attaching said pouch in freely suspended fashion from a fitting within a trunk compartment of the automobile, deploying said cover over the passenger compartment, when said trunk lid is open, by withdrawal directly from said pouch through an opening between said trunk lid and the automobile, said cover being unfurled while said substantially rigid crossbar is held by a user walking alongside said automobile, and removing said cover and returning it to storage, wherein said cover is stuffed without pre-folding directly into said pouch via said opening.

11. The method of claim 10 wherein said pouch attached step is performed by tying each of two pairs of laces, each pair being attached to an end of said pouch, to a respective one of a pair of hinges of said trunk lid of said automobile, such that said pouch is freely suspended in the trunk compartment.

12. The method of claim 10 further comprising the steps of positioning and fixing said crossbar under a pair of windshield wipers of the automobile.

* * * * *